United States Patent

[11] 3,626,954

| [72] | Inventor | Donald W. Ostrom<br>19625 W. 7 Mile Road, Detroit, Mich. 48219 |
|---|---|---|
| [21] | Appl. No. | 818,710 |
| [22] | Filed | Apr. 23, 1969 |
| [45] | Patented | Dec. 14, 1971<br>Original application May 15, 1967, Ser. No. 649,765, now Patent No. 3,472,246. Divided and this application Apr. 23, 1969, Ser. No. 818,710 |

[54] METHOD OF FORMING HAIRPIECE
3 Claims, 12 Drawing Figs.

| [52] | U.S. Cl. | 132/5, 264/90, 264/222, 264/243, 264/DIG. 30 |
|---|---|---|
| [51] | Int. Cl. | A41g 5/00, B29c 1/02 |
| [50] | Field of Search | 264/89, 90, 92, 222, 243, DIG. 30; 132/5, 53, 54 |

[56] References Cited
UNITED STATES PATENTS

| 2,604,104 | 7/1952 | Perlin | 132/53 |
| 2,814,301 | 11/1957 | Schmitz | 132/5 |
| 2,850,023 | 9/1958 | Taylor | 132/54 |
| 3,077,891 | 2/1963 | Lane | 132/53 X |
| 3,165,107 | 1/1965 | Martin et al. | 132/53 |
| 3,189,035 | 6/1965 | Heck | 132/5 |
| 3,421,521 | 1/1969 | Rich, Jr. | 132/53 X |

Primary Examiner—Robert F. White
Assistant Examiner—J. H. Silbaugh
Attorney—Whittemore, Hulbert & Belknap ABSTRACT: Method of forming a hairpiece which comprises forming a concave cast conforming to the shape of the head, forming a mold from the cast, modifying the surface of the mold to produce a groove, and shaping a foundation element to conform to the mold.

PATENTED DEC 14 1971 3,626,954

INVENTOR.
DONALD W. OSTROM
BY Whittemore
Hulbert & Belknap
ATTORNEYS

METHOD OF FORMING HAIRPIECE

CROSS-REFERENCE TO RELATED APPLICATION

The present application is a division of copending application Ser. No. 649,765, filed May 15, 1967 now U. S. Pat. No. 3,472,246.

BRIEF SUMMARY OF THE INVENTION

In accordance with the present invention the hairpiece is formed of relatively thin flexible material preferably polyethylene plastic, which, while it is extremely light and thin is nevertheless form sustaining to the extent that its major area will remain in spaced relation to the scalp of the wearer. The edge of the foundation piece is inclined to extend at a substantial angle to the main portion thereof so as to insure close contact with the scalp of the wearer, and so as to operate to maintain the intermediate portion of the foundation piece in spaced relation.

The invention relates to the method which comprises producing a hollow cast conforming precisely to the shape of the head of the wearer, outlining the area of the hairpiece with a built-up projection, forming a mold from the cast having the shape of the head of the wearer except for the continuous groove or channel formed by the built-up projection, and finally, forming the foundation piece in exact conformity with the mold and channel so that the foundation conforms exactly in shape to the head of the wearer except for a downwardly or inwardly directed continuous flange about its periphery.

DETAILED DESCRIPTION

Figure 1:
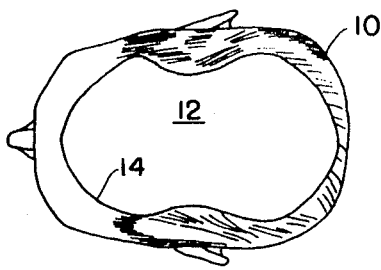
FIG. 1 is a plan view of a head with the area to be covered by the hairpiece outlined.

Referring first to FIG. 1 there is illustrated at 10 the head of an individual having a bald area 12 which is to be covered by a hairpiece. The first step in the production of the hairpiece is to outline the area to be covered by the hairpiece by drawing on the scalp of the individual the line 14 using for this purpose a water-soluble pencil.

Figure 2:
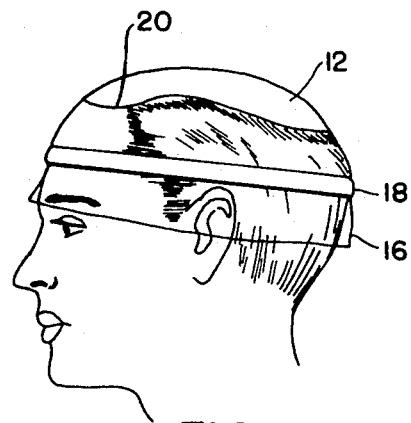
FIG. 2 is a side elevation of the head, illustrating the application of a smooth plastic film thereto.

Thereafter, as best seen in FIG. 2, a thin plastic film 16, preferably a polyethylene film, having a thickness of approximately 0.008 inch, is drawn over the head of the individual and is retained in place by a relatively strong elastic band 18. The lower portion of the film is drawn down firmly so that the film is caused to stretch and conform itself without wrinkling to the scalp of the individual. Where the polyethylene film overlies hair, as around the periphery of the area 12, the hair is pressed down firmly and leaves the portion of the polyethylene film above the band 18 completely smooth and unwrinkled.

At this time, with the water-soluble pencil, the line 14 on the scalp of the individual is traced over providing an identical line 20 on the polyethylene film.

Thereafter, a cast 22 is made of the top portion of the head of the individual using plaster of paris-impregnated gauze strips as is familiar in building up casts of this type. The area to be covered with the cast extends beyond the area to be covered by the hairpiece a convenient distance, as for example approximately one inch. After setting the cast is removed and is marked with the name of the individual for subsequent identification.

Removal of the cast from the head of the individual of course results in separation from the polyethylene film 16 which remains in place on the head of the individual.

As a result of the presence of the water-soluble markings on the exterior surface of the polyethylene film, the outline of the area 12 produced by the water-soluble pencil line 20 will be visible at the hollow interior of the cast 22.

Figures 4, 4A, 4B, 4C, 4D:
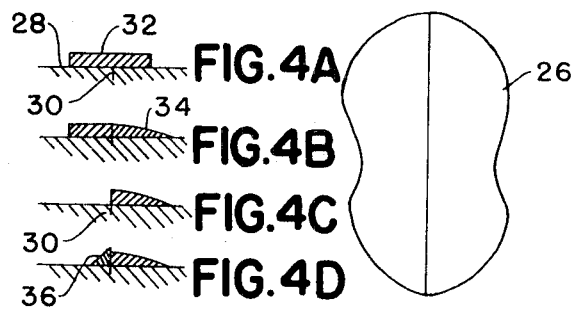
FIG. 4 illustrates a template used for producing a symmetrical outline.
FIGS. 4A–4D illustrate successive steps in the application of a built-up strip along the outline or edge of the hairpiece.

In order that the hairpiece shall be symmetrical the next step is to place within the cavity 24 of the cast 22 a flexible separate material such, for example, as wax paper. This material is caused to conform to the double concave curvature of the cavity by creasing it as required, and the creases may be retained in position by a suitable pressure sensitive tape. Thereafter, the outline of the transferred line 20, visible through the transparent sheet material, is traced over with a pencil and the transparent sheet material is removed from the cavity of the cast. Thereafter, the sheet material is folded longitudinally so as to provide a central crease and to cause the pencil line markings at opposite sides of the crease to conform to each other as nearly as possible. However, since this line results from a marking on the scalp of the individual, a tracing through the polyethylene film 16 and a transfer from the polyethylene film to the interior of the cavity 24, the area included by this line will not normally be symmetrical. Accordingly, the creased transparent sheet material is now trimmed so that when it is opened out, perfect symmetry about a longitudinal axis exists. The trimmed sheet material is illustrated in FIG. 4 and comprises the template 26. The template 26 is replaced within the cast cavity and its outline is carefully traced within the cast cavity and determines the exact shape of the hairpiece foundation which is ultimately to be produced therefrom.

Following tracing of the template 26, a continuous built-up bead is provided in the cast cavity as illustrated in FIG. 3, and FIGS. 4A–4D. In these Figures the surface of the cavity in the cast is illustrated at 28 and the location of the line 30 which has been traced around the edge of the template 26 is shown. A relatively thin strip of suitable material, such for example as a wax strip 32 having a rectangular cross-sectional dimension of 1×1/16 inch, is shaped to extend around the continuous outline 30 substantially centrally thereof. The strip 32 is caused to adhere lightly to the cast cavity by pressing and shaping the outer edge portion 34 thereof as illustrated in FIG. 4B. Thereafter, using a suitable sharp instrument, the portion of the strip 32 lying within the outline 30 is cut away and removed, leaving the construction as illustrated in FIG. 4C. Finally, a generally triangular wax strip 36 having a height only slightly higher than the thickness of the strip 32 is applied along the inner edge thereof as illustrated in FIG. 4D.

Figure 3:
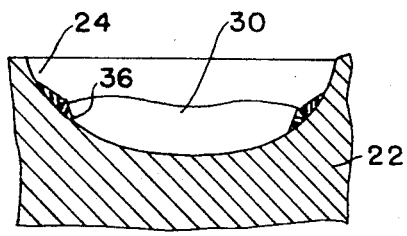
FIG. 3 is a view of a cast produced by the application of suitable casting material to the head of the user.

After the cast cavity has been supplied with the continuous strip as described, it appears as illustrated in FIG. 3 and is ready for forming the mold. First, a suitable parting agent, such for example, as Vaseline or a similar material, is applied over the surface of the cast cavity and liquid plaster of paris is then poured to fill the cavity. After the mold has set it is removed from the cast and is of course marked with the name of the individual for later identification. The surplus material outside the groove or channel 38 is removed by a suitable operation, such for example, as filing along the dotted lines 40 in FIG. 5, leaving the shallow groove 41 seen in FIG. 7.

Figure 5:
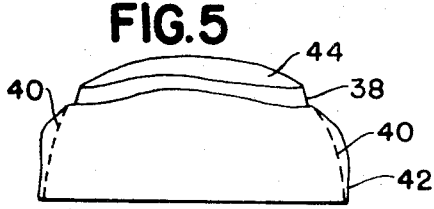
FIG. 5 is an elevational view of the mold produced from the cast shown in FIG. 3.

It will be apparent that as a result of the foregoing, the mold 42 shown in FIG. 5 has a convex surface area 44 conforming exactly to the shape of the scull or scalp of the individual in the area to be covered by the hairpiece surrounded by the continuous groove or channel 38. This area is smoothed with sandpaper and is then ready for the production of the foundation. For this purpose the mold 42 is placed in a vacuum forming machine under a continuous sheet of hot polyethylene plastic. The polyethylene plastic is preferably of a thickness of approximately 0.030 inch and in any case, between 0.025 and 0.060 inch. The formulation of the particular polyethylene plastic selected for this purpose is such that the sheet material is quite flexible, having only enough stability to be substantially self-supporting as to shape. On the other hand, its flexibility is such that a hairpiece may if desired, be rolled into a small package. More important, the flexibility of the foundation is such that when the finished hairpiece is applied to the head of the wearer, pressure applied to any portion of the hairpiece results in ready deformation thereof so as to prevent separation of the hairpiece or any part thereof from the scalp of the individual.

Figure 6:
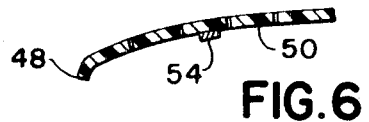
FIG. 6 is a fragmentary sectional view through an edge portion of the foundation piece produced using the mold of FIG. 5.

In the vacuum-forming machine the sheet of hot polyethylene plastic is lowered over the mold and vacuum is applied to the underside so as to cause the film to conform with great exactitude to the surface configuration of the mold. The shaped polyethylene material is allowed to cool and is then removed from the mold and is trimmed to produce the foundation 46. The foundation has its edge inclined substantially as illustrated at 48 FIGS. 6 and 8, and the peripheral edge portion includes the angularly disposed depending lip resulting from the provision of the groove or channel 38. From the foregoing it follows that the under surface of the foundation, as illustrated at 50, conforms exactly to the shape of the scalp of the individual for whom it is designed but it will normally be spaced above the scalp of the individual by reason of the depending peripheral portion 52. This spacing of the under surface of the foundation from the scalp of the individual is further provided by means of the attachments 54 which secure the hairpiece to the scalp of the user. The attachments 54 may include pressure sensitive tape at both sides, one side being thus adhered to the under surface 50 of the foundation, and the lower surface being adapted to adhere to the scalp of the individual, and are thus readily replaceable.

Figure 7:
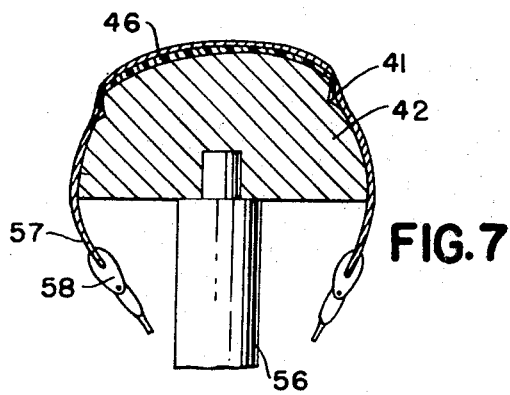
FIG. 7 illustrates the application of silk vegetable netting to the foundation piece.

After the cooled and set polyethylene foundation has been removed and trimmed, a multiplicity of holes 55 are punched therein to provide for the passage of air through the foundation so as to provide comfort in wearing the hairpiece. After the foundation has thus been completed as to shape it is replaced on the mold, as for example, as seen in FIG. 7, the mold 42 being positioned on a post 56. The upper surface of the foundation is now coated with a fluid sealer which may be made of any suitable elastomeric resin or plastic material, such for example, as neoprene, acrylic resins, nitrile rubbers, or the like, containing sufficient activator in the form of a volatile solvent therefor to permit the material to be applied as, for example, by a brush. The material is applied in a coating of substantial thickness but such that the ventilating openings through the foundation are not closed. The volatile solvent evaporates and leaves a dry flexible coating adhered to the upper surface of the foundation.

Figure 8:
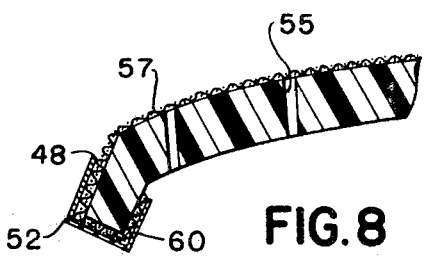
FIG. 8 is an enlarged fragmentary sectional view of the completed foundation piece prior to ventilating or attaching hair thereto.

Thereafter, a piece of silk vegetable netting 57 is cut to approximate shape with edge portions adapted to extend substantially beyond the edge of the foundation 46 and in fact beyond the edge of the mold 42. The silk vegetable netting is first draped over the assembly as illustrated in FIG. 7, and a multiplicity of clips 58, as for example, eight in number, are attached substantially uniformly around its periphery. Thereafter, the silk vegetable netting 57 with the clips 58 attached is removed and is soaked in hot water to soften it and to render it capable of being shaped or molded to conform without wrinkling to the double convex curvature of the foundation 46. Thereafter, the silk vegetable netting 57 is placed over the assembly and the clips 58 are attached to a corresponding number of levers each of which has a ratchet associated therewith. The silk vegetable netting is now drawn down over the assembly of the mold 42 and the foundation 46 by applying pressure in a step-by-step manner to opposed pairs of levers. After the silk vegetable netting has been caused to conform without wrinkling to the upper surface of the foundation, it is dried in place and is retained in assembled position by the insertion of a few pins through the netting and into the plastic. The clips are then removed and the netting is trimmed leaving an edge dimensioned to fold under the edge portion of the foundation. This edge portion is slotted inwardly to approximately the edge of the foundation so as to permit the inner portions to be shaped without wrinkling and to smoothly engage the inner surface of the depending lip 52. Thereafter, wig ribbon 60 is applied to extend around the edge of the hairpiece and it is first hand basted and then sewed in place, the sewing operation leaving the wig ribbon in overlying relation to the edge portion of the silk vegetable netting, as best illustrated in FIG. 8. This arrangement leaves a slight bead around the lip 52 of the foundation to which hair may be attached in the usual manner. Preferably, individual hair or hairs are hand tied to the silk vegetable netting and to the wig ribbon so that the foundation piece is completely concealed in use.

The outer end portions of hairs tend to be relatively more curly than the remainder, and for this reason it is preferred to use such end portions to tie into the wig ribbon, and thus to aid in concealing the edge of the hairpiece and to give it a more natural appearance. In order to retain the hair firmly in position, the polyethylene foundation has a suitable plastic sealer applied thereto, as described above. After the foundation piece has been ventilated by tying the hair in place to the individual strands of the silk vegetable netting, the sealer is softened by applying an activator with a hypodermic syringe, and the foundation is flexed first in one direction and then in another to tension the vegetable netting more firmly against the foundation, and to embed it in the softened sealer. The hair knots are thus embedded in the sealer to lock them permanently to the silk vegetable netting. The activator evaporates and the sealer remains in position. It is to be noted that the sealer is applied in quantities such as to prevent plugging or closing of the ventilating openings provided in the foundation.

The final step in completing the hairpiece is in the application of the attaching elements 54 previously referred to. These elements may be in the form of vinyl strips having pressure sensitive strips with adhesive on both surfaces applied to both sides thereof. The adhesive at one side of the vinyl strip attaches the strip to the inner surface of the hairpiece, and the adhesive surface at the other side of the vinyl strip adhesively attaches the hairpiece to the scalp of the individual. The thickness of the vinyl is selected in conformity with the height of the bead provided at the edge of the hairpiece and the final result is a hairpiece which closely engages the scalp of the individual around its periphery but which is spaced therefrom uniformly throughout its entire area by the attaching adhesive strips or blocks.

Since the hairpiece is characterized by the fact that its peripheral portion conforms exactly to the scalp of the wearer, and particularly since the entire body area of the foundation is quite flexible, it is possible for the individual wearing the hairpiece to lie down with the portion of the hairpiece in contact with a pillow or the like without causing the opposite side of the hairpiece to lift up. Similarly, the hairpiece is capable of yielding under externally applied pressure to any area within its periphery.

A further advantage of the hairpiece as disclosed herein is that as the natural hair of an individual surrounding the hairpiece begins to become gray, it is possible to tie into the hair of the hairpiece sufficient gray hairs to cause the hairpiece to match the natural hair of the wearer. When additional hair is tied in as described above, additional sealer is preferably added and is activated as before by the use of an activator applied by hypodermic syringes. A still further advantage of course is that the hairpiece is always subject to the addition or replacement of hair as it becomes worn, as for example, at the hair line. The sealer which retains the previously tied hairs in place will not of course prevent lifting of the individual strands of the silk vegetable netting for the addition or replacement of hairs, followed as indicated above, by a resealing operation.

An important advantage in the use of the plastic foundation is that the plastic does not absorb perspiration. Moreover, it is chemically inert and perspiration does not tend to cause it to shrink or deteriorate.

What I claim as my invention is:

1. In the method of forming a mold for use in vacuum forming a foundation for a hairpiece, the steps of forming a cast of the individual's head, marking in the hollow interior of the cast a line conforming to the area corresponding to the area to be covered by the hairpiece, applying a flat strip of formable transparent material to extend completely around the area and to overlie the line, trimming away the portion of the flat strip material located within the aforesaid area, providing within the aforesaid area a generally triangular strip having one side extending along the aforesaid line and having a corner positioned slightly above the remaining portion of the flat strip, and thereafter pouring a settable material into the cast to form a mold having a surface conforming substantially exactly to the shape of the head of the individual but including around its periphery a continuous groove or channel having an inclined surface.

2. In the method of making a mold as described in claim 1, the step of trimming away the portion of the mold lying outside the groove or channel produced by the triangular strip in the mold.

3. The method of making a hairpiece which comprises shaping a thin plastic film to conform without wrinkles to the head of an individual, marking on the film the outline of the area to be covered by the hairpiece, forming a cast over the head, outlining in the cast the area to be covered by the hairpiece, building up at the edge of the area in the cast corresponding to the area to be covered by the hairpiece a tapered bead, pouring a liquid settable material into the cast and causing it to set to form a mold having a groove therein conforming to said bead, separating the mold from the cast, trimming away the portion of the mold outside the tapered surface therein produced by the bead, vacuum forming a layer of heated thermoplastic material over the mold, trimming the edge of the layer of thermoplastic material to conform to the edge of the groove, applying a fluid-sealing material to the outer surface of the foundation and allowing it to dry, softening a netting material and tensioning it over the foundation to cause it to conform without wrinkling thereto, applying a binding of wig ribbon around the edge of the foundation overlying the edge of the netting and sewing it in place, and after the foundation has been ventilated by the tying of hairs to the individual strands of the netting, softening the sealing material by the application of a suitable activator thereto, and tensioning the netting to embed the hair knots in the sealing material.

* * * * *